CHASSIS, BASE, AND COVER FASTENING MEANS

Filed Jan. 10, 1957

INVENTORS
HERMAN J. WISE
GEORGE O. PUERNER
BY [signature]
ATTORNEY 2,858,179
Patented Oct. 28, 1958

2,858,179

CHASSIS, BASE, AND COVER FASTENING MEANS

George O. Puerner, Frankfort, Ind., and Herman J. Wise, Stevensville, Md., assignors to P. R. Mallory & Co., Inc., Indianapolis, Ind., a corporation of Delaware Application January 10, 1957, Serial No. 633,503

2 Claims. (Cl. 312—257)

Figures 1, 2, 3:
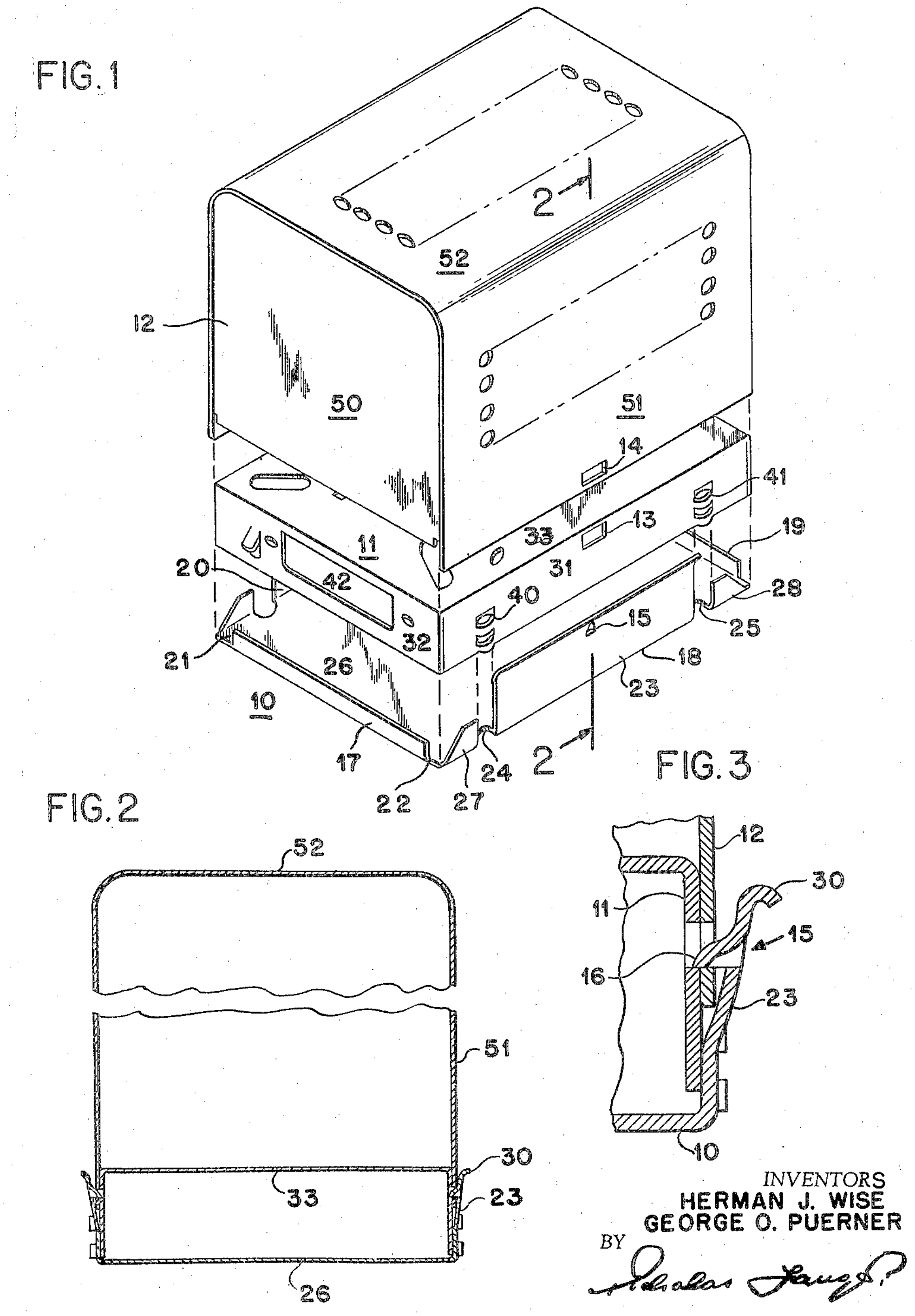

This invention relates to power supply mounting and assembly means and has particular reference to a chassis, base, and covering means constituting the same, and as specifically used for mounting and holding electrical components such as electrical interruptors and power supply components.

In assembling components and mounting the same, it has always been desirable to reduce the necessity for utilizing cumbersome staking, joining and/or soldering techniques. This is so because in assembling, servicing, and maintaining electrical equipment, it is necessary that rapid and efficient assembling and disassembling needs be considered. Further, such mounting means, because of the limited space requirements where there is a need to conserve such space, and also because the necessity for efficient temperature dissipation and dust prevention, requires a compact yet rugged assembly. The present invention thus discloses improved means for securing a base and cover to the chassis of a power supply or amplifier without the use of screws, nuts, or other conventional means.

It is, therefore, an object of the present invention to provide a novel chassis, base, and cover-fastening means for a power supply.

Still another object of present invention is to provide a novel chassis, base, and cover assembly adapted to be fastened and joined by mere interfitting of the parts and without the necessity of soldering or welding said parts together.

Still another object of the present invention is to provide a compact power supply mounting assembly having interfitting components readily adapted for assembling and disassembling and for more efficient servicing and mounting the same.

It is an object of the invention to provide a compact power supply mounting assembly having interfitting components adapted for assembly without the use of nuts, bolts, rivets, and/or pins.

Yet another object of the present invention is to provide an efficient, compact, and cheap power supply mounting assembly whose parts are joined by mere interfitting.

The above and other objects of the invention will be apparent from the following description accompanying figures of the drawing and the appended claims.

The present invention of a novel chassis, base, and covering-fastening means provides a bottom plate which is adapted to snap into place with the chassis. The cover is also adapted to snap into place and the whole assembly is held together by a projection located in the sides of the base plate and as shown in the figures of the drawing. The assembly, thus provided, is a compact and readily fastened one which is easy to mount and service since there is no need for the usual soldering or screw and nut methods heretofore used.

The form chosen to exemplify the invention is illustrated in the accompanying figures of the drawing; and wherein Figure 1 is an exploded profile view especially adapted to illustrate the interfitting of the cover, chassis, and bottom plate;

Figure 2 is a cross-sectional view of the assembly showing the parts interfitted and as taken along line 2—2 of Figure 1;

And Figure 3 is an enlarged fragmental partial sectional view showing the details and construction of the assembly wherein the cover, chassis, and bottom plate are snap-fitted and held together without the necessity of any other type holding means such as conventional screws and fasteners.

As shown in the figures of the drawing, the invention is directed toward an assembly for holding and supporting electrical components such as those included in a vibrator power supply. The individual parts of the assembly are constructed in a manner such that the separate parts will interfit or overlap and be ruggedly clamped together without requiring any other means for gathering the same such as would normally be used that is; i. e. screws and bolts, etc. In the present construction the bottom base plate 10 of the assembly snaps into place with its associated overlying chassis 11. The cover for the assembly 12 fits over the chassis so as to snap into place with it and the base plate. Means for aiding this snap fit includes a pair of matching cutouts 13, 14 formed in the sides of the cover and the chassis as held down by a projection 15 having a lip 16 extending out from a vertical side of the bottom plate (Figure 3).

The bottom plate 10 of the assembly may have any desired geometric configuration but in the present embodiment is rectangularly configured and has a plurality of sides 17–20 extending substantially vertically, upwardly from the bottom thereof. The opposing sides of the plate that extend upwardly are of equal height with the adjacent sides being of differing height. The smaller sides have end portions such as 21, 22 forming L shaped cutouts. The adjacent high sides, each has a main center portion 22 separated from the ends by hemicircular apertures such as 24, 25 formed in the bottom plate 26. On each side of these apertures are truncated side portions 27, 28.

The main portion 23 of each larger side of the base includes a struck-out projection 15 having a tongue or lip 16 which is adapted to be used as hereinafter described. The top portion of the large side 18 of the base 10 has a curved flange integrally formed therewith.

Chassis 11 of the assembly is rectangularly configured and has a plurality of sides such as 31 and 32 depending substantially vertically from the top thereof. Side 31, as well as its opposing side, includes a small rectangular cutout 13 which will be adapted to mate with a similarly configured cutout 14 in cover 12 as hereinafter described. This side also includes a pair of struck-out threads 40, 41 which are adapted to overlie the semicircular apertures cutout of the base plate, as previously described. Side 32 also has a large rectangular cutout formed therein as adapted to hold an electrical plug.

The cover 12 for the assembly has a substantially rectangular cupola-like configuration including a pair of end walls such as 50, and a pair of side walls such as 51, joining the top 52 to form the housing for the assembly. Each of the sides 50 of the cover extend for a distance beyond its associated end walls, said extending portion thereof including a mating rectangular cutout 14 which is adapted to overlie and mate with the rectangular cutout 13 in the chassis. Top 52 and the sides 51 of the cover have a plurality of ventilating holes formed therein, used for purposes of heat dissipation.

Referring particularly to Figure 3, it now becomes apparent that the novel construction provides means for securing the base and cover to the chassis without the use of screws or nuts. As seen, and as described above, the bottom plate snaps into place upon the chassis and the cover also snaps into place and the whole assembly is held together by the projection located in each of the sides of the base plate.

In assemblying the parts, the sides of the base plate which extend substantially vertically therein, are folded inwardly slightly from the vertical so that they are adapted to spring out when pushed on to the chassis. This characteristic creates a tension which keeps the projection or "catch" inside the rectangular apertures formed in the sides of the chassis and cover. As stated previously, the rectangular apertures in the cover are adapted to exactly line up with the apertures in the chassis so that the projection protrudes through both apertures to thereby hold both the cover and the base to the chassis in a substantially tight manner, yet, in a manner which allows for easy disassembly should this be necessary. It is seen, therefore, that no other type of fastening is necessary and that other additional type of fasteners need not be used. It is to be noted, moreover, that provision has been made for bolting the entire assembly to a cooperating part through the use of the hemicircular apertures and threads formed in the sides of the chassis.

Although a complete assembly has here been described, using a base plate, chassis, and a cover, therefore, it is possible that the teachings of the invention may be utilized in environments where the cover itself may not be needed; namely, in equipment where an overall cover is used for a more complicated assembly in which the present assembly components are fitted.

The present invention, thus offers several advantages among which are the following:

(1) Time and labor for installing screws and/or nuts are eliminated, especially in tight quarters;

(2) Screws, nuts or other fastening parts need not be bought or stocked thereby lessening assembly costs;

(3) The cover can be removed separately, leaving the base plate securely fastened merely by inserting a screw driver blade from the top, springing the side of the bottom plate outwardly from the chassis disengaging the projection from the rectangular holes, and then lifting cover from the chassis. The projection snaps back into place, leaving the base plate securely fastened although the cover is removed. The cover can be replaced merely by pushing down until it snaps. In this way the cover can be removed for changing the tubes or vibrator even when the chassis is screwed down to the chassis of a transmitter or receiver. Further, the cover can be removed even if the power supply is mounted next to other equipment which would otherwise make it impossible to use a screw driver from the side to remove screws.

(4) The fastening means is fabricated during the regular punching and forming operations, so that no separate tool or operation is required. This makes for lower cost of production.

(5) Because of the spring action of the sides of the base plate, the parts are held tightly thereby eliminating rattles or vibration of parts during the operation of the power supply or amplifier.

(6) The dimensions of the fastening means do not have to be held to critical tolerances, thereby keeping manufacturing rejects to a minimum.

The invention of the novel assembly for power supply mounting has been described herein more or less precisely but it is to be understood that changes may be made in the arrangement and proportion of parts and that equivalents may be substituted without departing from the spirit and scope of the invention.

The invention is claimed as follows:

1. An assembly for housing and supporting electrical components comprising a bottom plate having a plurality of sides extending upwardly therefrom in an essentially vertical plane, said sides being slightly sprung from said plane, a chassis having a plurality of sides engaging said sides of said plate and a cover having sides extending over said chassis adapted to fit between said latter sides and those of said bottom plate, a pair of apertures formed in said cover and said chassis, said apertures adapted to overlie each other, and gripping means integrally formed in the side of said bottom plate, said gripping means adapted to engage said apertures of said cover and said chassis whereby said cover, said chassis, and said bottom plate are adapted to snap together so that a ready assembly thereof may be obtained.

2. An assembly for housing and supporting eelctrical components comprising a bottom base having a plurality of integrally formed turned up portions, a chassis adapted to be placed on said base having a plurality of downwardly extending sides, some of said turned up portions of said base being spaced beyond said chassis sides and others of said turned up portions of said base being retained within said chassis sides, a cover having sides falling over said chassis sides and having two of said sides falling within turned up portions of said base, and means on said base, chassis and cover to snap fit all of the same together without resorting to screw and other similar gathering means.

References Cited in the file of this patent

UNITED STATES PATENTS

| | | |
|---|---|---|
| 2,439,412 | Mitchell | Apr. 13, 1948 |
| 2,658,101 | Coxe | Nov. 3, 1953 |
| 2,665,353 | Popp | Jan. 5, 1954 |